Sept. 11, 1956
C. B. DOTY
2,762,649
COLLAPSIBLE TOP SIDE RAIL STRUCTURE
Filed April 6, 1951
3 Sheets-Sheet 1
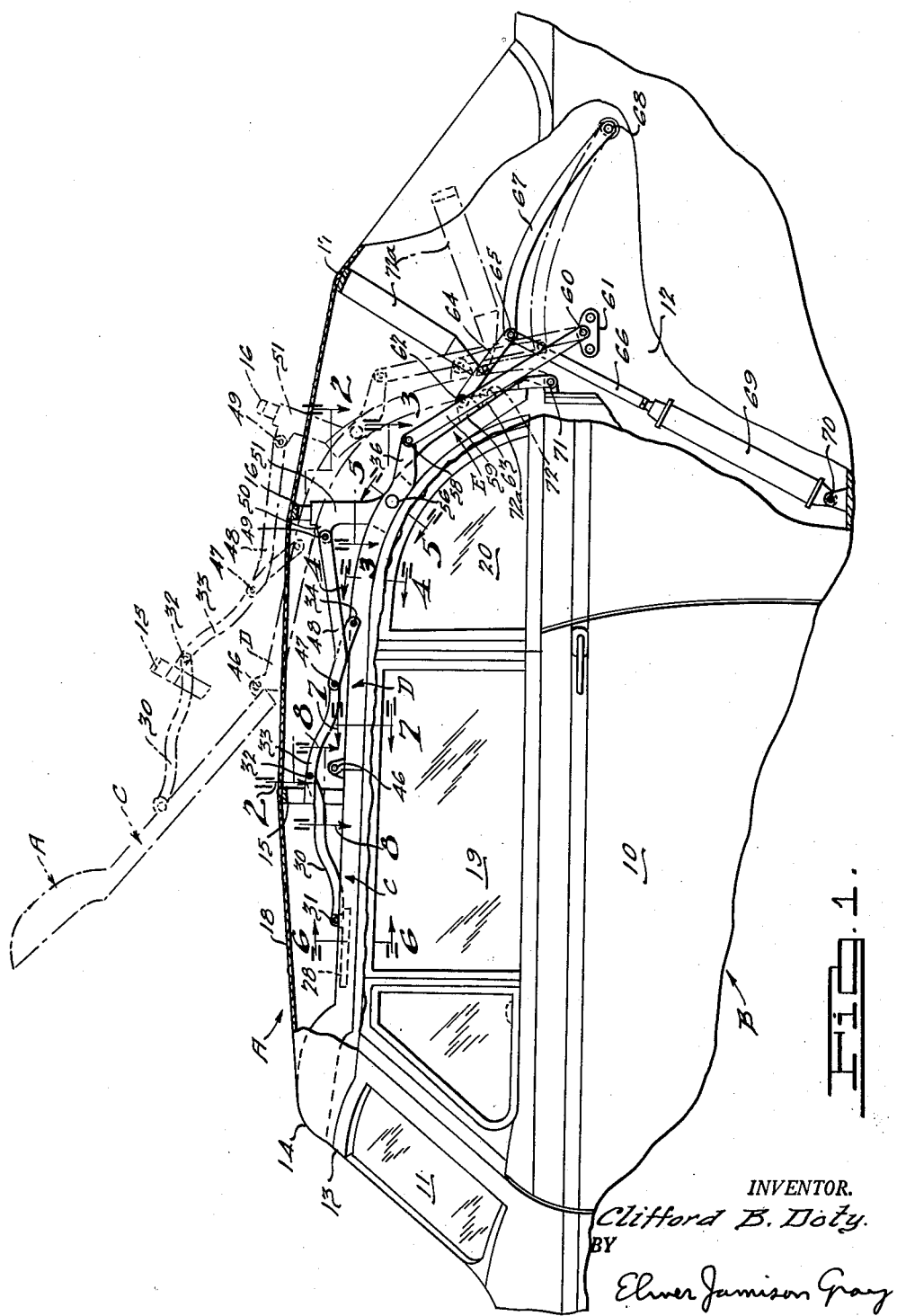
INVENTOR.
Clifford B. Doty.
BY
Elmer Jamison Gray
ATTORNEY.

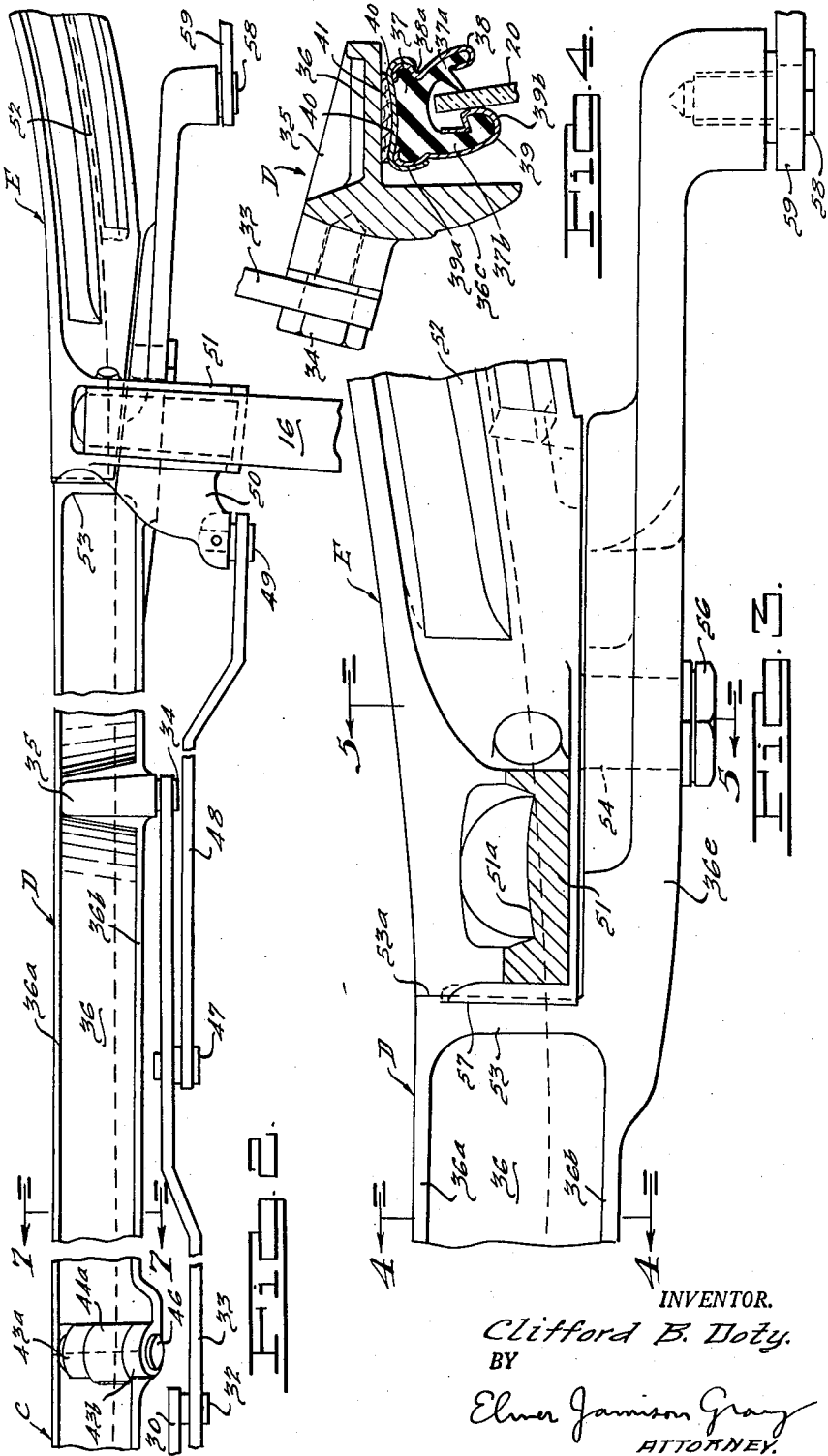

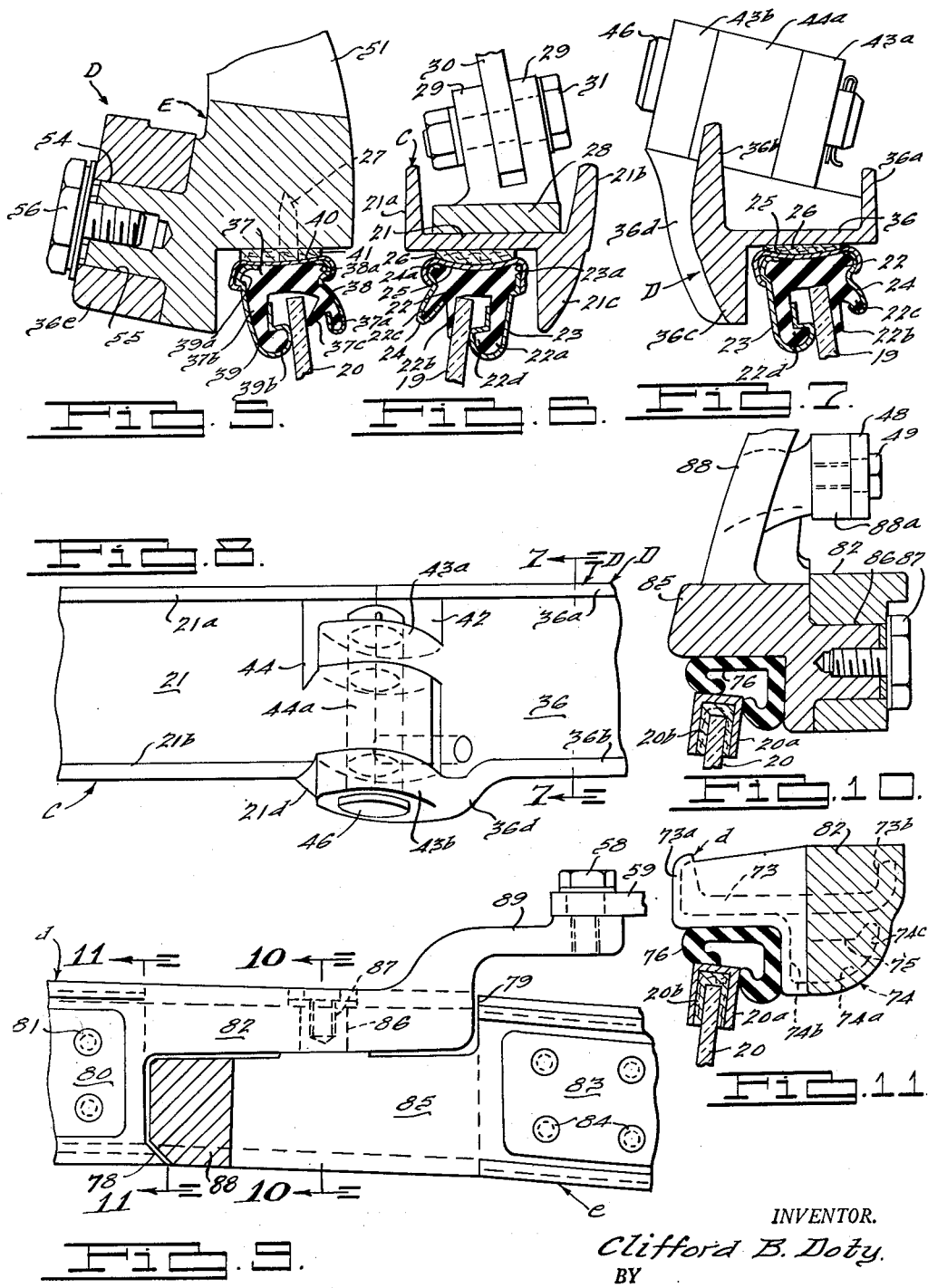

United States Patent Office 2,762,649
Patented Sept. 11, 1956

2,762,649

COLLAPSIBLE TOP SIDE RAIL STRUCTURE

Clifford B. Doty, Detroit, Mich., assignor, by mesne assignments, to Chrysler Corporation, a corporation of Delaware Application April 6, 1951, Serial No. 219,625

2 Claims. (Cl. 296—116)

This invention relates to vehicle bodies and more particularly to automobile bodies of the so-called convertible type having foldable or collapsible tops.

An object of the invention is to improve the construction of the foldable or collapsible tops of automobile bodies or the like so as to provide a more compact unit when collapsed or folded into the body while at the same time increasing the strength of the top when in open position, reducing to a minimum the cross-sectional size of many of the component parts of the top and improving the appearance of the top when in operative position.

Another object of the invention is to provide a side rail structure for the foldable top comprising a pair of rail members each having a longitudinal upwardly opening channel portion terminating at an end in an extension which laterally overlaps the extension of the other rail member and is pivoted thereto intermediate its ends. These extensions provide mountings for the operating links and fabric supporting bows and also close the ends of the channels to provide flat abutting ends for the rail members. In addition, the extensions from the ends of the channel portions enable most of the operating links to be neatly arranged immediately above and substantially in the vertical plane of the rail members, thereby largely eliminating the necessity, as heretofore, of having the top operating link mechanism protrude into the passenger space within the body and avoiding not only an unsightly appearance but also a hazard to the passengers when the top is folded back or collapsed.

Still another object is to provide a collapsible or foldable top for a vehicle body in which certain of the side rail members, to which the edges of the fabric top are secured, are in the form of an upwardly opening channel reinforced by a longitudinal reinforcement depending from the base of the channel and spaced from the outer edge of said base to provide therewith a longitudinal recess for the upper edge of a window panel. A sealing strip is mounted in the recess to receive said window panel edge. The depending reinforcement extends below the sealing strip so as to hide the same from the view of an occupant of the vehicle when the top is in unfolded condition.

Another object is to provide such a sectional side rail wherein the depending reinforcement comprises a channel-like element closed at its top by the bottom web of the upper channel, the improved construction providing a strong and neat appearing side rail having a combined channel and box-like cross-sectional structure.

Other objects of this invention will appear in the following description and appended claims, reference being had to the accompanying drawings forming a part of this specification wherein like reference characters designate corresponding parts in the several views.

Fig. 1 is a fragmentary side elevation of a convertible type vehicle body constructed in accordance with the present invention, portions being broken away to illustrate the top operating mechanism and foldable linkages for the right side, the latter being also shown in phantom in the initial stages of folding.

Fig. 2 is an enlarged fragmentary plan view of the rear and intermediate righthand side rails, taken in the direction of the arrows substantially along the line 2—2 of Fig. 1.

Fig. 3 is an enlarged fragmentary plan view partly in section taken in the direction of the arrows substantially along the line 3—3 of Fig. 1, the middle bow being removed.

Fig. 4 is a fragmentary transverse sectional view taken substantially in the direction of the arrows along the line 4—4 of Figs. 1 and 3.

Fig. 5 is a fragmentary transverse sectional view taken substantially in the direction of the arrows along the line 5—5 of Figs. 1 and 3.

Fig. 6 is a fragmentary transverse sectional view taken substantially in the direction of the arrows along the line 6—6 of Fig. 1.

Fig. 7 is a fragmentary transverse sectional view taken substantially in the direction of the arrows along the line 7—7 of Figs. 1 and 2.

Fig. 8 is an enlarged fragmentary plan view of the articulation between the front and intermediate rail members, taken in the direction of the arrows substantially along the line 8—8 of Fig. 1.

Fig. 9 is a view similar to Fig. 3, but showing a partially sectioned elevation of a modification of the intermediate and rear rail members at their juncture on the left hand side of the vehicle top.

Fig. 10 is a transverse sectional view taken substantially in the direction of the arrows along the line 10—10 of Fig. 9.

Fig. 11 is a transverse sectional view taken substantially in the direction of the arrows along the line 11—11 of Fig. 9.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a continuation-in-part of my copending application Serial No. 14,230, filed March 11, 1948, now forfeited.

In the drawings there is illustrated by way of example a collapsible or foldable top A embodying an application of the present invention for a two-door automobile body B. It will be understood however that the invention may be utilized in connection with other types of vehicles or automobile bodies, such as convertible bodies of the four-door type. The body B is provided with a door 10 at each side, a windshield 11, and the top A adapted to be folded into a compartment or space 12 located between the rear seat of the body and the rear deck compartment.

The windshield 11 terminates at its upper edge in a rigid transverse header 13. The collapsible top A terminates at its forward edge in a transverse hollow header 14 adapted to engage the upper edge of the header 13 and to be clamped thereto by suitable manually operated mechanism located principally within the header 14 and actuated by means of a handle (not shown) accessible to the front seat passenger at a point above the windshield. When the header 14 of the foldable top is forced down into engagement with the upper edge of the windshield 11, it is preferably located in position by means of upright locating pins or studs on the header 13.

The collapsible or foldable top A includes a front bow 15, intermediate or middle bow 16, and a rear bow 17 over which the fabric 18 of the top is stretched. The opposite side edges of the fabric 18 are attached to foldable side rails forming a part of the top assembly and hereinafter described more fully. The front edge portions of the fabric 18 covers and is secured to the header 14. Slidably mounted within the door 10 is a glass panel 19. Rearward of the panel 19 is a glass quarter panel 20 which is preferably mounted to move upward or downward into a well within the body sidewall. The foregoing may be of conventional construction and is accordingly not discussed in detail.

Since the construction of the foldable top with reference to the side rails and operating linkage for the bows 15, 16 and 17 is the same at each side of the body, it will suffice to illustrate in Figs. 1 through 8 the structure at the right side of the body only. The foldable top is provided at each side with a sectional side rail extending from the header 14 to the rear of the body at a point adjacent the upper front edge of the compartment 12. This sectional side rail comprises a front rail member C, a middle rail member D pivoted thereto, and a rear rail member E pivotally connected to the intermediate rail member D.

Referring to Fig. 6, the front rail member C comprises a unitary upwardly opening metal channel member having a bottom horizontal web 21 and upright longitudinally extending outer and inner channel sides or flanges 21a and 21b respectively, the latter being of somewhat greater thickness than the flange 21a. Also integral with the web 21 and extending longitudinally of its inner edge below the channel side wall 21b is a depending flange 21c which is somewhat thicker at its juncture with the web 21 than the flange 21b. The bottom or under surface of the web 21 meets the outer vertical face of the flange 21c substantially at right angles to provide a longitudinal outward and downward opening rabbeted portion or recess extending the full length of the rail member C.

By this construction, the flange 21c serves both as a reinforcement for the rail member as well as a shield for the usual compressible weatherstrip adapted to receive and cushion the upper edge of the window panel 19 when the latter is in raised or closed position, Figs. 6 and 7. In the present instance, the weatherstrip comprises a comparatively heavy longitudinal cushioning pad 22 having flexible depending inner and outer channel side flanges 22a and 22b and a third retaining web or flange 22c extending longitudinally of the outer edge of the pad 22 and depending therefrom outwardly of the channel side 22b. The inner channel side 22a is considerably thicker than the outer channel side 22b and is enclosed within an upward opening channel-like sheet metal container 23. The lower edge of the channel side 22a is provided with a longitudinal bead 22d which fits within a correspondingly formed recess in the cover member 23 formed to interlock with the bead 22d and to press outward snugly against the inner face of the window glass 19 adjacent the latter's upper edge. The upper portion of the inner channel sidewall of the cover member 23 is formed to provide a longitudinal bead 23a extending inward toward the depending flange 21c and terminates in an outwardly extending edge which overlies the inner edge of the resilient pad 22. The latter is formed to fit closely within the recess provided by the bead 23a and thus interlocks with the cover member 23.

Similarly, the outward and downward extending resilient retaining flange 22c is closely confined within a generally upward opening channel-like cover member 24 having the upper portion of its outer channel sidewall formed to provide an outward extending bead 24a and to terminate in an inwardly extending edge closely overlying the outer edge of the pad 22. The latter is also formed to fit snugly within the bead 24a, thereby to interlock with the cover member 24. The assembled strips 22, 23, 24 are forced into a resilient channel-like retaining strip 25 having depending channel sides engaging the corresponding beads 23a and 24a in interlocking relation. The upper surface of the strip 25 rests against the lower surface of a longitudinal spacer 26. The assembled channel 25 and spacer 26 are suitably secured to the rail member C, as for example by a plurality of tapered pins 27, Fig. 5.

Mounted within the channel portion of the front rail member C and intermediate its ends, Fig. 6, is a cast insert or bracket member 28 suitably secured to the base web 21, as for example by bolts not shown. Extending integrally upward from the bracket insert 28 are spaced ears 29 having the forward end of a link 30 therebetween and pivoted thereto by means of a bolt 31. The link 30 inclines rearwardly when the top is in unfolded condition, Fig. 1, and is pivoted at its rear end by a bolt 32 to the forward portion of a rearwardly declined link 33. From the bolt 32, the link 33 extends forward and is rigidly secured to the lower end of the front bow 15. The rear end of the declined link 33 is pivoted by a bolt 34 to a pivot support 35 integral with the middle rail section D and extending transversely across the channel mouth thereof to provide an inward projection into which the bolt 34 is secured, Figs. 2 and 4.

As indicated in Fig. 7, the channel construction of the middle rail member D is substantially the same as the rail member C, comprising an upwardly opening channel having a bottom horizontal web 36 terminating in upright outer and inner channel side flanges 36a and 36b, the latter being substantially thicker than the outer sidewall 36a. Extending downward from the inner edge of the bottom web 36 is a depending flange 36c comparable to the shield and reinforcement flange 21c and forming with the web 36 a downwardly and outwardly opening right angular rabbeted portion or recess extending the full length of the rail D within which is mounted the rearward portions of the flexible weatherstrip 22 and also a comparable weatherstrip 37 for the upper edge of the quarter panel 20. As indicated in Figs. 2 and 4, the channel base or web 36 curves upwardly from the rearward portions of the rail section D toward the pivot support 35 to effect a channel section of minimum depth thereat. The channel web 36 also curves downwardly forward of the pivot support 35 to the full channel depth as indicated in Fig. 7.

Underlying the rearward portions of the middle rail member D at the region of the quarter panel 20, Figs. 4 and 5, is the aforesaid weather strip 37 comprising a longitudinal cushioning pad or web having depending outer and inner sides 37a and 37b interlocked within generally channel-like cover elements 38 and 39 respectively. The outer resilient channel side 37a is provided with an inward projection 37c near its lower end adapted to engage and press against the upper outer edge portion of the quarter panel 20 when the latter is in closed position. Below the projection 37c, the inner channel wall of the cover element 38 extends downward and around the lower edge of the flexible channel side 37a, continuing upward as an outer channel wall fitting closely to the channel side 37a. The upper outer edge of the cover element 38 is formed to provide an outward extending bead 38a, similar to the bead 23a, into which a corresponding portion of the web 37 snugly fits in interlocking relation.

Similarly the channel cover element 39 fits snugly around the depending channel side 37b and overlaps the upper inner edge of the web 37. A bead 39b extends outwardly from the lower portion of the cover element 39 to press snugly against the inner upper edge portion of the quarter window panel 20 and interlocks with a mating bulge at the lower portion of the channel side 37b. Also the upper portion of the cover element 39 is provided with an inner bead extension 39a similar to the bead 23a and having upper inner portions of the web 37 interlocked therein. The longitudinally extending beads 38a and 39a are retained within the sides of a retaining channel strip 40 spaced from the underside of the web 36 by a spacer element 41 and suitably secured to said web 36, as for example by tapered pins similar to the pin 27, Fig. 5.

Referring to Figs. 7 and 8, the inner flanges 36b and 36c at the forward end of the rail member D are thickened inwardly at 36d and terminate in a vertical forward edge, Fig. 1, abutting the rearward vertical edge of a similar enlargement 21d of the inner flange portions 21b and 21c of the forward rail member C when the top A is unfolded. Also the major portion of the channel section at the forward end of the rail D is filled by a transverse boss 42, which may comprise a separate element welded in place within the rail section or may be formed integrally therewith and which is provided with a pair of transversely spaced upright ears or lugs 43a and 43b, Fig. 7. The latter ear extends upright over the depending thickened inner channel sidewall 36d.

Extending across the rearward end of the channel portion of the front rail member C and integral therewith or welded thereto is a transverse boss 44 having an upright pivot supporting boss 44a intermediate the ears 43a and 43b and pivoted thereto by means of a bolt 46. The bosses 42 and 44 are provided with abutting vertical end faces flush with the aforesaid vertical ends of the enlarged inner channel sidewall portions 36d and 21d respectively.

At a suitable location intermediate the ends of the link 33 but somewhat closer to the pivot 34, the link 33 is pivotally connected at 47 to the forward end of a relatively long link 48, Figs. 1 and 2. The latter extends rearward in the unfolded condition of the top and is pivoted at its rearward end at 49 to a crank arm 50 extending generally forward from an upright bow supporting leg 51. The latter as indicated in Fig. 3 comprises an outwardly opening channel section 51a curved upwardly and inwardly in conformance with the corresponding lateral downwardly bowed end of the bow 16 which fits within the channel portion 51a and is suitably secured thereto, as for example by rivets.

The rear rail section E is similar to the rail sections C and D, comprising an upwardly opening channel portion and an integral shield or reinforcing flange underlying the inner channel sidewalls so as to form with the underside of the channel base a right angular recess or rabbet for the reception of the resilient or flexible weatherstrip 37 along the lower and rearward portions of the quarter window panel 20, Figs. 2 and 5. In the present instance, the rear rail section E is also provided with an upright reinforcing flange 52 extending longitudinally of the channel base intermediate the channel sides, Fig. 2.

Referring particularly to Fig. 3, the channel portion of the intermediate rail D is closed at its rear end by an integral transverse web 53 which extends between the channel sides 36a and 36b flush with their top edges and terminates rearwardly in an upright end wall 53a. In the region of the web 53, the inner side of the rail D is offset inward to effect a thickening of the inner channel sidewall 36b and underlying reinforcement flange 36c, which extend together as an inwardly offset extension 36e curving rearwardly and downwardly. The latter cooperating with the end wall 53a provides a rearwardly and outwardly opening recess into which the forward end extension of the rear rail section E fits closely in abutting relation with the end wall 53a, Fig. 3.

As indicated in Figs. 2 and 3, the forward end of the channel portion of the rear rail section E terminates rearward of the bow supporting leg 51, whereupon the rail E continues forward as a solid extension merging upward with the integral bow support 51, Fig. 5, and abutting the wall 53a. The inner face of the solid forward end extension of the rail E fits flat against the outer face of the offset extension 36e. Thus the extension 36e and forward solid end portion of the rear rail E overlap each other in mutually supporting side-by-side relation when the top is in unfolded condition and together correspond in contour to the contour of the rail members D and E. Projecting generally inward from the solid end portion of the rail E is a cylindrical pivot boss 54 which extends through a pivot opening 55 in the adjacent extension 36e. The rails D and E are thus pivotally connected and are retained in pivotal relation by a bolt 56 which screws coaxially into the boss 54. Unfolding pivotal movement of the rail D about the pivot 54 is limited at the desired unfolded position by a forward projection 57 of the rail E overlying the web 53, Fig. 3.

Rearward of the pivot 54, the extension 36e terminates in an enlarged pivot supporting boss which is pivoted by a bolt 58 to the forward end of a comparatively long rearwardly declined link 59. The rear end of this link is pivoted at 60 to a bracket 61 secured to the body within the compartment 12, Fig. 1. Pivoted at 62 to an upright boss 63 of the unfolded rear rail section E intermediate the ends of the latter is a link 64, which at its rear end is pivoted at 65 to the upper end of a reciprocating plunger 66. A guide link 67 somewhat longer than the link 64 cooperates with the latter to comprise a toggle and to guide folding and unfolding movements of the top. In the unfolded condition of the top, the link 67 declines slightly rearward, being pivoted at its forward end to the pivot 65 and pivoted at its rearward end to the body at 68 within the compartment 12.

The plunger 66 declines forwardly from the pivot 65 and is reciprocated linearly by a hydraulic piston and cylinder mechanism 69 pivotally connected at 70 to the vehicle body near the base of the compartment 12. The rear or lower end of the rail E is pivotally connected at 71 to the body at a location slightly forward of and above the pivot 60, so that upon downward movement of the plunger 66, the rail E is swung upward and rearward by the cooperating action of the toggle links 64 and 67. Simultaneously, the intermediate rail D is swung downward about the pivot 54 by virtue of the swinging link 59 pivoted to the rearward extension 36e. Likewise, the link 48 connecting the bow support 51 and link 33 swings the forward rail C upward about its pivot 46. A double jack-knife action is thus effected, folding the rail section C upward and over the intermediate rail element D, which in turn is folded downward about its pivot 54 over the rear rail E.

The rear bow 17 is pivoted at each end at 72 to a pivot supporting boss 72a extending integrally upward from the rear rail E at a location slightly below the boss 63, whereby as the rail E swing rearward and the tension in the top fabric 18 is relaxed, the rear bow 17 swings downward into the compartment 12.

Referring now to Figs. 9 through 11, a modification of the present invention is shown comprising metal side rail members preferably formed by extrusion to provide a combined channel and box-like structure. In Fig. 9 a sectional view similar to Fig. 3 is shown at the pivotal connection between the rearward end of the intermediate rail member d and a rear rail member e corresponding to the rail members D and E respectively in function and in general relationship to the top structure, but located at the lefthand side of the vehicle. As illustrated in Fig. 11, the intermediate rail member d comprises a top upwardly opening channel having a bottom horizontal web 73 and upright outer and inner side flanges 73a and 73b. Also comprising an integral feature of the rail d is an underlying flange in the form of a channel-like section 74 which has a bottom web 74a terminating in an upright outer wall or flange portion 74b which merges integrally into the bottom web 73. The web or bottom 74a of the channel-like flange 74 preferably slopes upwardly and inwardly into an inner wall 74c which merges integrally into the bottom 73 of the upper channel portion. Thus the underlying hollow member 74 forms with the bottom section 73 of the upper channel a closed box-like structure. During the process of extruding the metal to form the rail $d$, the web 73 is preferably formed with a continuous longitudinally extending rib 75 which projects into the interior of the underlying channel-like section 74. It will be noted that the hollow underlying section 74 of the rail is narrower than the upper channel portion, thus providing a longitudinal inwardly and downwardly opening rabbeted portion formed by the angularly related walls 73 and 74b. By virtue of this construction there is provided a recess extending the full length of the intermediate rail $d$ within which is mounted a flexible or resilient weatherstrip 76 engageable as shown in Fig. 11 by the upper edge of the window panel 20 in the raised or closed position. The latter in this instance is shown with its outer edge enclosed within a channel element 20a, as for example of chrome plated steel, spaced from the window panel edge by a channel formed felt spacer 20b and suitably bonded to the latter and adjacent edge portion of the window panel 20. The extruded portions of the rear rail $e$ as well as the forward or front rail which is not shown preferably have similar cross-sectional contours and are accordingly not discussed in detail.

Referring particularly to Fig. 9, the extruded channel portion of the intermediate rail $d$ terminates at a point 78 spaced somewhat from the front terminal point 79 of the extruded channel portion of the rear rail $e$. Mounted within the upwardly opening channel of the intermediate rail is a cast insert or bracket 80 secured in position to the web 73 by means of rivets 81. This bracket is provided with a rearward extension 82 having its inner sidewall and bottom shaped in accordance with the corresponding contour of the intermediate rail member so as to form in effect a continuation thereof, Fig. 11. The extension 82 terminates substantially in abutting relation with the forward end 79 of the rear rail member.

Mounted within the upwardly opening channel portion of the rear rail member $e$, is a cast insert or bracket 83 secured in position by means of rivets 84. This bracket is generally similar to the bracket 80 and in like manner is provided with an extension 85 which extends alongside the extension 82, when the top is in folded position, and terminates substantially in abutting relation with the rear end 78 of the intermediate rail section. Thus the bracket extensions 82 and 85 overlap each other in side-by-side relation throughout their entire lengths when the top is unfolded, and together correspond in contour to the contour of the sections of rails $d$ and $e$.

These bracket extensions are pivoted together by a cylindrical pivot element 86 integral with the bracket extension 85 intermediate its ends and projecting inward through a mating pivot hole in the adjacent portion of the bracket extension 82, the assembled rail members being held in pivotal relation by a bolt 87, Fig. 10.

Cast as an integral portion of the forward end of the bracket extension 85 is an upright bow supporting leg 88, Figs. 9 and 10, which is suitably secured to the corresponding depending end of the intermediate top bow 16 and which is provided with an integral inwardly projecting crank arm 88a pivoted to the rear end of the link 48 by bolt 49. The rear end of the bracket extension 82 is provided with an integral inwardly extending crank arm 89, which is comparable to the aforementioned rearward extension 36e of the intermediate rail section D and is pivotally connected by the bolt 58 to the forward end of the rearwardly declined link 59.

I claim:

1. In a foldable top for a vehicle body, a pair of side rails, each rail comprising a channel portion and an integral extension, each channel portion opening upwardly and extending longitudinally of the rail substantially in end-to-end alignment with the other channel portion, said extensions projecting endwise from their integral channel portions and laterally overlapping each other between the adjacent ends of the channel portions, and means pivotally connecting said extensions together at a location between said adjacent ends, the endwise spacing between said adjacent ends of the channel portions being greater than the length of one of said extensions endwise of its integral channel portion, the other extension having a web substantially closing the adjacent end of its integral channel portion, said other extension throughout its length endwise of said web being spaced laterally of the end of the channel portion integral with said one extension and terminating beyond the latter end in a support for a pivotal connection, and said one extension terminating in abutting relation with said web.

2. The combination in a foldable top according to claim 1 wherein said other extension comprises a laterally thickened endwise projection of the inner wall of its integral channel portion.

References Cited in the file of this patent

UNITED STATES PATENTS

| | | |
|---|---|---|
| 2,213,222 | Keller | Sept. 3, 1940 |
| 2,272,299 | Ingildsen et al. | Feb. 10, 1942 |
| 2,329,802 | Westrope | Sept. 21, 1943 |
| 2,540,454 | Milhan | Feb. 6, 1951 |
| 2,559,482 | Votypka | July 3, 1951 |